E. W. COOK.
STEERING MECHANISM FOR TRACTORS.
APPLICATION FILED SEPT. 2, 1915.
1,190,264.
Patented July 11, 1916.
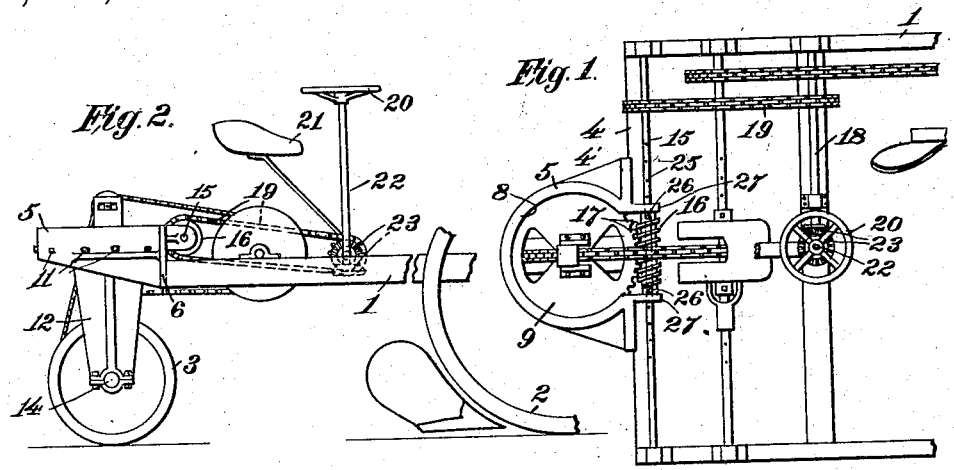
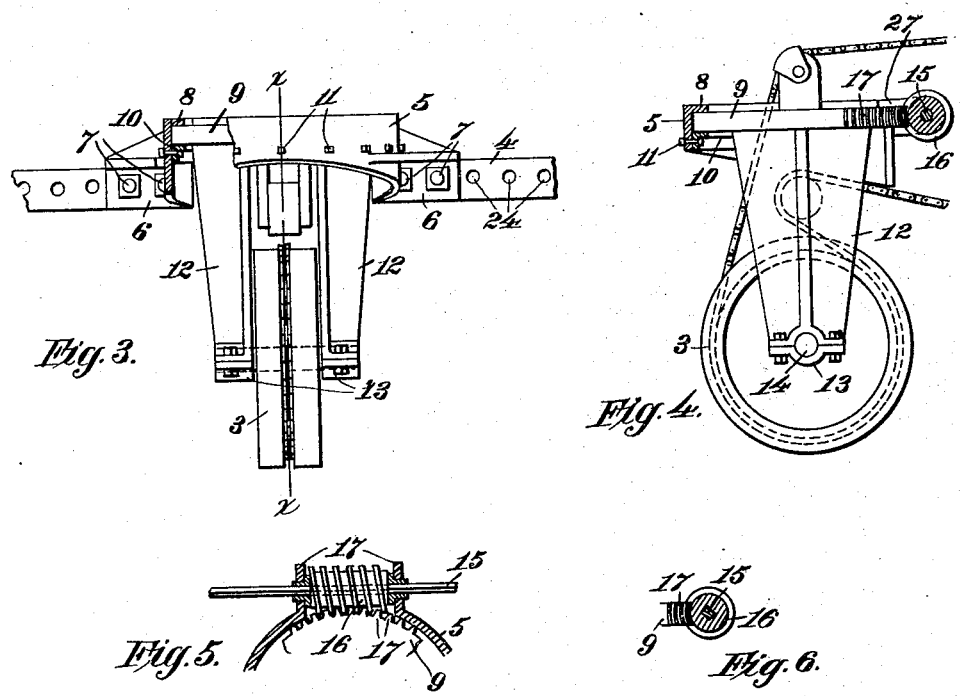
Inventor
Edward W. Cook,
By Joshua R. H. Potts
Attorney

UNITED STATES PATENT OFFICE.

EDWARD W. COOK, OF GALION, OHIO.

STEERING MECHANISM FOR TRACTORS.

1,190,264. Specification of Letters Patent. Patented July 11, 1916.

Original application filed April 19, 1915, Serial No. 22,341. Divided and this application filed September 2, 1915. Serial No. 48,599.

*To all whom it may concern:*

Be it known that I, EDWARD W. COOK, a citizen of the United States, residing at Galion, county of Crawford, and State of Ohio, have invented certain new and useful Improvements in Steering Mechanism for Tractors, of which the following is a specification.

My invention relates to tractors of the class employed for operating plows, cultivators, road scrapers and the like and particularly to steering mechanism for tractors of the character mentioned; the present application being a division of my co-pending application Serial No. 22,341.

The object of my invention is to provide improved steering mechanism for a tractor of the class under consideration which shall be under the manual control of the operator and of such construction that the traction wheel used for steering the device may be shifted laterally of the frame of the tractor, as desired, or found necessary according to the nature of the work being done.

A further object of my invention is to provide steering means as mentioned further characterized by such construction as will permit of the above mentioned adjustment of the guiding traction wheel without necessitating shifting or changing of the hand wheel by means of which the steering gear is operated.

Other objects will appear hereinafter.

With these objects in view my invention consists generally in a wheeled frame, a bracket secured to one end of the frame and adapted to be laterally adjusted thereon, a fifth wheel rotatably mounted in said bracket, a traction wheel mounted upon said fifth wheel and manually operable means for turning said fifth wheel.

My invention further consists in a device as mentioned further characterized by providing worm teeth on the periphery of the fifth wheel, a worm in mesh with said worm gear, a transverse shaft on the frame upon which the worm gear is slidably and adjustably secured and means for manually operating said shaft.

My invention further consists in various details of construction and arrangement of parts, all as will be fully described hereinafter and particularly pointed out in the claims.

My invention will be more readily understood by reference to the accompanying drawings forming a part of this specification and in which—

Figure 1 is a fragmentary plan view of the frame of a tractor equipped with a steering mechanism embodying my invention, Fig. 2 is a side elevation of the same, Fig. 3 is a rear elevation of the laterally adjustable bracket and parts carried thereby, illustrated upon an enlarged scale and showing the adjacent portion of the frame, a portion being broken away to better illustrate the construction, Fig. 4 is a longitudinal section on the line *x—x* of Fig. 3, the fifth wheel and parts carried thereby being illustrated in elevation, and Figs. 5 and 6 are detail views of a modified form of a portion of the device.

Referring now to the drawings 1 indicates the frame of a tractor mounted upon wheels 2 and 3, the latter forming a portion of the steering mechanism as will appear hereinafter. The frame 1 includes a transverse end beam 4 upon which the wheel 3, through suitable means, is mounted. This is usually arranged at the rear of the frame but it will be obvious that the same may be arranged at the forward end of the frame without departing from my invention. Although hereinafter the end bearing the steering mechanism will be called the rear end, it is to be understood that this is to be construed with sufficient breadth to include the forward end when it is desired so to arrange the device.

Secured to the transverse beam 4 is a bracket 4′ comprising a hollow cylindrical member 5, preferably open upon the side adjacent the frame and provided with laterally extending flanges 6 which are perforated to receive securing bolts 7 for attaching the bracket to said beam. The upper end of the portion 5 is provided with an inturned peripheral flange 8 and fitting snugly within said portion 5 and bearing against the under face of said flange is rotatably mounted a fifth wheel 9.

10 indicates a follower fixed within the portion 5 of the bracket and bearing against the under face of the periphery of the fifth wheel for holding the same in position, said follower being angular in cross section and secured in position by bolts or other suitable securing means 11. Rigidly mounted upon the fifth wheel 9 and depending therefrom is a pair of arms 12 provided at their lower ends with bearings 13 for the axle or trunnion 14 of the wheel 3.

Extending transversely of the frame parallel with the beam 4 is a shaft 15 upon which is mounted a worm 16 meshing with worm teeth 17 formed upon the periphery of the fifth wheel 9. As the fifth wheel is designed for limited movement to guide the device, it is obvious that the teeth 17 may extend throughout but a portion of the periphery thereof. 18 indicates a shaft parallel with the shaft 15 and connected thereto by sprocket gearing 19. A hand wheel 20 is provided adjacent the driver's seat 21 and mounted upon an upwardly extending steering post 22, said post being connected to the shaft 18 by a suitable gearing 23. As shown in the drawings this comprises a pair of beveled gears connected one to the post and one to the shaft 18 respectively. It is obvious that by turning the hand wheel 20 the worm 16 will be rotated which in turn will rotate the fifth wheel to steer the device.

In devices of the character under consideration it is frequently necessary or desirable to shift the wheel 3 laterally of the device in order to avoid injury to the crops under cultivation or interference with the implements carried by the tractor; and it is one of the principal objects of the present invention to provide means for shifting the same without interfering with the steering feature. To this end the beam 4 is provided with a plurality of spaced bolt holes 24 to receive the bolts 7 whereby the bracket bearing the fifth wheel may be laterally adjusted upon the frame. Suitable means must also be provided for shifting the worm on the shaft 15 and for holding the same in proper relation to the fifth wheel and also rotatably fixed to the shaft. To this end the shaft is provided with a series of holes or apertures 25 to receive pins 26 extending through the sleeve of the worm, the apertures 25 being spaced the same distances upon the shaft 15 as the bolt holes 24 are upon the beam 4. To facilitate shifting the worm with the fifth wheel, the bracket 4' is provided with rearwardly extending ears 27 between which the worm 16 is mounted and which are perforated to receive the shaft 15. It is obvious that upon shifting the bracket the worm will also be shifted after the removal of the pins 26. After the bracket is secured in position by means of the bolt 7 the pins 26 may be readily inserted to secure the worm to the shaft.

If preferred the major portion of the shaft 15 may be squared as shown in Figs. 5 and 6 and the worm provided with a squared bore to receive the same. By this construction it is unnecessary to provide the perforations 25 and the pins 26.

With the construction set forth in the above description it is obvious that the steering gear may be readily adjusted laterally of the frame and that without the necessity of any shifting or adjustment of the hand wheel by which it is operated.

I claim:

1. A frame mounted upon wheels, a bracket mounted upon said frame and adapted to be laterally adjusted thereon, a fifth wheel rotatably mounted in said bracket, a tractor carried by said fifth wheel, a shaft mounted transversely of said frame adjacent said fifth wheel, means secured to said shaft and longitudinally adjustable thereon for rotating said fifth wheel when said shaft is rotated, and means for rotating said shaft, substantially as described.

2. A frame mounted upon wheels, a bracket mounted upon said frame and adapted to be laterally adjusted thereon, a fifth wheel rotatably mounted in said bracket, a tractor carried by said fifth wheel, a rotatable shaft mounted transversely of said frame, a second shaft rotatably mounted in said frame substantially parallel with said first mentioned shaft, means adjacent the driver's seat for rotating said second shaft, an operative connection between said shafts, means secured on said first mentioned shaft and longitudinally adjustable thereon for rotating said fifth wheel when said first mentioned shaft is rotated, substantially as described.

3. A frame including a transverse beam, a bracket adjustably mounted upon said beam, a fifth wheel rotatably mounted in said bracket, a tractor wheel carried by said fifth wheel, a transverse shaft on said frame, said fifth wheel being provided in its periphery with worm teeth, a worm mounted on said shaft and meshing with said worm teeth, said worm being adjustably secured to said shaft and means for manually rotating said shaft, substantially as described.

4. A frame mounted upon wheels and including a transverse beam provided with a series of bolt holes, a transverse shaft on said frame provided with correspondingly spaced apertures, a bracket provided with flanges abutting said beam and perforated to receive securing bolts, bolts extending through said flanges and said beam for adjustably securing the bracket to the frame, a fifth wheel rotatably mounted in said bracket, a tractor wheel carried by said fifth wheel, said fifth wheel being provided in its periphery with worm teeth, a worm mounted upon said shaft and meshing with said worm teeth and a pin extending through said worm and adapted to engage in the perforations in said shaft, substantially as described.

5. A frame, a bracket laterally adjustable on said frame, a transverse shaft on said frame, a fifth wheel rotatably mounted in said bracket and provided with worm teeth in its periphery, a worm slidably mounted on said shaft and meshing with said teeth, ears on said bracket engaging opposite ends of said worm, means for preventing relative rotation of said worm and said shaft and means for rotating said shaft, substantially as described.

6. In a device of the class described, a frame mounted upon wheels, a transverse beam at the rear of said frame provided with a series of apertures, a bracket, means engaging in said apertures for adjustably securing said bracket to said beam, a fifth wheel mounted in said bracket, a tractor carried by said fifth wheel, worm teeth formed on the edge of said fifth wheel, a rotatable shaft mounted transversely of said frame, said shaft being provided with a series of apertures, a sleeve slidably mounted upon said shaft, a worm formed upon said sleeve, said sleeve being provided with an aperture adjacent its end adapted to register with said apertures in said shaft, a second shaft mounted transversely of said frame, means for manually operating said second shaft, and an operative connection between said shafts, substantially as described.

7. In a device of the class described, the combination of a frame mounted upon wheels and including a transverse beam provided with a series of bolt holes, a bracket adjustably secured to said beam, a fifth wheel mounted in said bracket, a tractor carried by said fifth wheel, said fifth wheel being provided with worm teeth upon its periphery, a shaft rotatably mounted transversely of said frame, said shaft being provided with a series of perforations, a sleeve slidably mounted upon said shaft and provided with a perforation adjacent its end, a worm formed upon said sleeve adapted to mesh with said fifth wheel and rotate the same, a second shaft mounted transversely of said frame, a post vertically mounted upon said frame, a hand wheel fixed on said post, gearing connecting the lower end of said post and said second shaft, sprocket gearing connecting said second and first named shafts, as and for the purpose set forth.

In testimony whereof I have signed my name to this specification in the presence of two subscribing witnesses.

EDWARD W. COOK.

Witnesses:
JOHN H. COOK,
MILDRED RICKER.